(12) United States Patent
Suzuki

(10) Patent No.: US 6,397,807 B1
(45) Date of Patent: Jun. 4, 2002

(54) INTERNAL COMBUSTION ENGINE HAVING COMBUSTION HEATER

(75) Inventor: Makoto Suzuki, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 79 days.

(21) Appl. No.: 09/606,725

(22) Filed: Jun. 29, 2000

(30) Foreign Application Priority Data

Jun. 30, 1999 (JP) .......................................... 11-186922
Feb. 10, 2000 (JP) .......................................... 2000-034265

(51) Int. Cl.⁷ .............................................. F02N 17/02
(52) U.S. Cl. ................................ 123/142.5 R; 123/567
(58) Field of Search ................................ 123/550, 551, 123/567, 142.5 R

(56) References Cited

U.S. PATENT DOCUMENTS

| | | |
|---|---|---|
| 3,687,122 A | 8/1972 | Kamo |
| 4,749,028 A | 6/1988 | Okura et al. |
| 4,858,825 A | 8/1989 | Kawamura |
| 4,927,077 A | 5/1990 | Okada |
| 5,048,752 A | 9/1991 | Hintennach et al. |
| 6,055,964 A | 5/2000 | Suzuki |
| 6,131,553 A | 10/2000 | Suzuki |
| 6,178,938 B1 | 1/2001 | Suzuki |

FOREIGN PATENT DOCUMENTS

| | | |
|---|---|---|
| EP | 0916823 | 5/1999 |
| EP | 931817 | 10/1999 |
| JP | 60-79149 | 5/1985 |

OTHER PUBLICATIONS

Patent Abstracts of Japan; vol. 012, No. 083 (M–677) Mar. 16, 1988 (Mar. 15, 1988) & JP 62 223460 A (Diesel Kiki Co., LTD.), Oct. 1, 1987.

Primary Examiner—Tony M. Argenbright
Assistant Examiner—Katrina B. Harris
(74) Attorney, Agent, or Firm—Kenyon & Kenyon

(57) ABSTRACT

An internal combustion engine having a combustion heater is capable of enhancing an engine starting characteristic by improving warm-up of the engine and ensuring a sufficient oxygen content in intake air of the engine. An ECU executes, at the engine starting time, an augmentation control of augmenting the oxygen content in the engine intake air by an air blow fan. Under this augmentation control, the engine intake air is supplemented with the oxygen, and, with this supplement, the engine intake air becomes the intake air with oxygen content that is effective enough for starting the engine.

7 Claims, 8 Drawing Sheets

INTERNAL COMBUSTION ENGINE HAVING COMBUSTION HEATER

BACKGROUND OF THE INVENTION

1. Field of the Invention

The present invention relates generally to an internal combustion engine having a combustion heater and, more particularly, to an internal combustion engine having a combustion heater for introducing a combustion gas into an intake system of the internal combustion engine in order to speed up warm-up of the internal combustion engine.

2. Related Background Art

An internal combustion engine mounted in a vehicle such as an automobile, etc. is constructed to operate at a high efficiency within a predetermined temperature range. The reason is that an engine fuel such as gasoline, a light oil, etc. is hard to evaporate at, e.g., a low temperature with the result that there arise troubles such as a starting characteristic is impaired and so on, because of the difficulty of igniting those fuels, and hence those troubles should be prevented.

Further, as known well, an interior of a car room can be warmed by utilizing the heat evolved in the internal combustion engine when the engine works, but can not be warmed if a heating value is insufficient.

Such being the case, for instance, Japanese Patent Application Laid-Open Publication No. 60-79149 discloses a technology of utilizing the combustion heat of the combustion heater incorporated into the internal combustion engine for the purpose of speeding up warm-up of the engine and enhancing a performance of a car room interior warming device.

According to this technology, a high-temperature combustion gas of the combustion heater is introduced into an intake pipe of the internal combustion engine, and intake air of the engine is heated by this combustion gas, thereby facilitating actuation of the engine even when the internal combustion engine is in a low-temperature state.

The combustion gas emitted from the combustion heater is, however, an exhaust gas emitted when burning the fuel. The exhaust gas has a less oxygen content than an oxygen content in the air before being used for the combustion.

Therefore, as by the technology disclosed in the above Publication, when introducing the combustion gas into the intake pipe, if scheming to increase a ratio of the combustion gas contained in the intake air flowing through the intake pipe by augmenting the quantity of the combustion gas, though the warm-up of the engine is speeded up, a ratio of oxygen content in the intake air might decrease on the contrary.

As explained above, when the ratio of the oxygen content in the intake air decreases, a quantity of the combustion within the cylinders is restricted, resulting in such a state that the starting characteristic of the internal combustion engine might decline. The situation being so, if reducing the ratio of the combustion gas introduced into the intake pipe in order to ensure the oxygen quantity, this might in turn lead to an insufficient warm-up of the engine, and the starting characteristic is still impaired.

Especially at the engine starting time, since a crank shaft is rotated by an engine start assisting device such as a starter motor, etc., the engine speed is as low as, e.g., 100–200 rpm, and there is a small amount of intake air sucked into the cylinders from the atmospheric air via the intake pipe. Accordingly, there increases the ratio of the combustion gas in almost all intake air taken-in.

Therefore, the intake air containing the combustion gas at such a high ratio is absolutely unable to be used as engine intake air, and, in an extreme case, there is a possibility that the engine does not work.

SUMMARY OF THE INVENTION

It is a primary object of the present invention, which was devised under such circumstances, to provide an internal combustion engine having a combustion heater for raising a temperature of intake air of the internal combustion engine by introducing a combustion gas evolved when burning a fuel into the internal combustion engine and utilizing the heat held by the combustion gas, whereby a starting characteristic of the internal combustion engine is enhanced by positively replenishing oxygen to attain a sufficient oxygen content in the engine intake air while improving warm-up of the internal combustion engine.

To accomplish the above object, the present invention adopts the following means.

(1) An internal combustion engine having a combustion heater for raising a temperature of intake air of the internal combustion engine by utilizing combustion heat held by a combustion gas emitted when burning a fuel, and a combustion gas introducing passageway, through which a combustion gas discharge port of the combustion heater is connected to an engine intake passageway, for introducing the combustion gas into the intake passageway, comprising an oxygen supplying device for supplying oxygen to the engine intake air having become the intake air containing the combustion gas when the combustion gas is introduced via the combustion gas introducing passageway into the engine intake passageway, and an oxygen supply quantity control unit for controlling a quantity of oxygen supplied by the oxygen supplying device, and wherein the oxygen supply quantity control unit executes, at the engine starting time or before the engine starting time and also introducing the combustion gas into the engine intake passageway at that time, an augmentation control of augmenting the quantity of oxygen supplied to the engine intake air by the oxygen supplying device, the oxygen content in the engine intake air that is decreased due to the introduction of the combustion gas into the intake passageway, is supplemented under the augmentation control, and this supplement makes the engine intake air the intake air with oxygen content effective in enhancing a starting characteristic of the internal combustion engine.

Herein, what can be exemplified as "the oxygen supply quantity control unit" may be an ECU (electronic control unit) serving as an engine control unit for controlling operations of the whole internal combustion engine. In this case, an optimum oxygen content corresponding to an operation state of the internal combustion engine can be supplied under the control by the ECU.

The term "the engine starting time" implies a state where a crank shaft is rotated by an engine start assisting device such as, e.g., a starter motor or the like which is attached to the engine body, and a piston makes a reciprocating motion within the cylinder, namely in a cranking state, thereby the internal combustion engine eventually becomes independent enough to start its operation without depending on the starter motor.

The term "before the engine starting time" indicates the time before or preferably immediately before the engine (crank shaft) is rotated by the engine starting assisting device such as the starter motor, etc.

The term "starting characteristic" is, as a matter of course, a condition of how the internal combustion engine works and implies how easily the internal combustion engine independently starts operating.

The term "the intake air with oxygen content effective in enhancing the starting characteristic of the internal combustion engine" indicates a value obtained beforehand by a test performed for every internal combustion engine.

(2) The oxygen supplying device supplies the engine intake passageway with the oxygen through the combustion gas introducing passageway.

(3) The oxygen supplying device may be an air blow device capable of making an air quantity variable, and the air blow device may be an air blow fan for supplying the combustion heater with the air for combustion.

(4) The air blow fan includes a fan, a driving unit for rotationally driving the fan, and a fan rotational speed control device for controlling the rotational speed of the fan by controlling an operation of the driving unit. The fan rotational speed control device sets, at the engine starting time or before the engine starting time, the rotational speed of the fan higher than that in operation other than the starting time of the internal combustion engine. What can be exemplified as the fan rotational speed control device may be, e.g., the ECU serving as the engine control unit for controlling the whole internal combustion engine.

The term "when in operation other than starting the internal combustion engine" implies a state after the internal combustion engine has been started up, i.e., a state where, so to speak, the engine works. More specifically, that indicates a state in which the piston performs the reciprocating motion within the cylinder without depending upon the engine start assisting device such as the starter motor, etc., in other words, the piston is reciprocated by a combustion and explosion force gained at a combustion and explosion stroke in the operation strokes of the internal combustion engine, and the internal combustion engine operates independently of the engine start assisting device.

(5) A quantity of fuel supply to the combustion heater, at the engine starting time or before the engine starting time, is set equal to or smaller than the quantity of fuel supply when in the engine operation other than the engine starting time.

(6) The combustion heater includes an air supply passageway connected to the intake passageway and thereby functioning to supply the combustion heater with intake air as the air for combustion which flows through the intake passageway, and an intake air quantity regulating unit, provided between a connecting point at which the air supply passageway is connected to the intake passageway and a connecting point at which the combustion gas introducing passageway is connected to the intake passageway, for regulating a quantity of intake air in the intake passageway, and wherein the intake air quantity control unit, at the engine starting time or before the engine starting time and also introducing the combustion gas into the intake passageway at that time, may reduce the quantity of intake air.

Herein, for example, an intake throttle valve may be exemplified as "the intake air quantity regulating unit".

The term "reduction" may embrace a case where the intake air quantity is 0 (zero). If the intake air quantity control unit is the intake throttle valve, the reduction of the intake air quantity implies closing the intake throttle valve, and the case where the intake air quantity is 0 (zero) implies that the intake throttle valve is fully closed.

(7) In the internal combustion engine of the present invention may further comprise a bypass passageway, bypassing cylinders and communicating the engine intake system with an engine exhaust system, and wherein the combustion gas may be, at the engine starting time or before the engine starting time and also discharging the combustion gas from the combustion heater at that time, flowed to an engine exhaust passageway from the intake passageway via the bypass passageway.

What can be exemplified as "the bypass passageway" may be a passageway extending from the combustion gas introducing passageway to the exhaust passageway and connected to the exhaust passageway at a point, in the vicinity of a catalyst converter provided in the exhaust passageway on the upstream side, of this exhaust passageway, and may be an EGR passageway constituting an EGR (Exhaust Gas Recirculation) device aiming at reducing production of oxides of nitrogen by restraining a rise in a combustion temperature by flowing the exhaust gas coming out of an exhaust port back to the intake side.

The present invention has the construction described above and therefor exhibits, for example, the following operational effects.

The oxygen supply quantity regulating unit performs, at the engine starting time or before the engine starting time and also introducing the combustion gas into the intake passageway at that time, the augmentation control of augmenting the quantity of oxygen supplied to the engine intake air by the oxygen supplying device. Then, an augmented oxygen content under this augmentation control is a quantity to supplement the oxygen content in the engine intake air, the oxygen content of which has been decreased due to the introduction of the combustion gas into the intake passageway, up to a quantity effective in enhancing the starting characteristic of the internal combustion engine.

Accordingly, even when the intake air containing the combustion gas flows as the engine intake air toward the cylinders of the internal combustion engine, the oxygen content enough to enhance the starting characteristic of the internal combustion engine, is ensured for the engine intake air at the engine starting time with a low rotational speed of the engine or before the engine starting time in a state where the engine does not yet rotate. Hence, even if the heater combustion gas defined as the exhaust gas is introduced into the intake passageway at the engine starting time or before the engine starting time, the starting characteristic of the internal combustion engine is good.

In addition, it is at the engine starting time or before the engine starting time and also introducing the combustion gas into the intake passageway at that time that the oxygen supply quantity control unit executes the augmentation control of augmenting the oxygen quantity, and therefore the combustion heater operates during the execution of the augmentation control. That is to say, the fuel is burned. Accordingly, a high-temperature combustion gas is introduced into the intake system at the engine starting time or before the engine starting time, and the temperature of the intake air is raised by this high-temperature combustion gas, thereby speeding up the warm-up of the engine.

Thus, in the internal combustion engine having the combustion heater according to the present invention, the combustion heater operates at the starting time of the internal combustion engine or before the engine starting time, and, in addition, the combustion gas in the state of increased oxygen content augmented by the oxygen supply quantity control unit is introduced into the engine intake air. Therefore, the warm-up characteristic can be enhanced, and the oxygen content in the engine intake air can be ensured with no deficiency. Hence, the starting characteristic of the engine at a low temperature is facilitated.

Further, in the case where the internal combustion engine is a diesel engine, an ignition method of the diesel engine is based on the heat of the compressed air, and therefore, if the combustion chamber takes a complicated configuration as seen in, e.g., a swirl chamber type diesel engine, a rate of a heat loss increases correspondingly. For this reason, there is a diesel engine adopting a low-temperature start assisting device such as a glow plug and an electric intake heater which emit the heat by flowing electric current through them when starting up and thus assist the ignition in the combustion chamber.

The present invention, when applied to the above-described diesel engine, makes it possible to eliminate the necessity for the low-temperature start assisting device because of being capable of starting at the low temperature as described above. It is therefore feasible to reduce the number of parts and downsize the internal combustion engine.

Moreover, according to the present invention, the engine can be started at the low temperature, and, as a result, for example, a rate of lowering the temperature of the combustion gas due to heat radiation in the engine intake system is small as compared to the internal combustion engine which is unable to start if not at a high temperature. Accordingly, there is no need for adopting, for instance, a special heat insulating material as a measure for preventing decreasing the heat radiation in the engine intake system.

Further, according to the present invention, the intake passageway is supplied with the oxygen via the combustion gas introducing passageway, so that the combustion gas introducing passageway may serve also as an oxygen supply member. This eliminates the necessity of, e.g., a pipe member used exclusively for supplying the oxygen, and consequently it is possible to reduce the number of parts and downsize the apparatus correspondingly.

Moreover, at the engine starting time or before the engine starting time and also introducing the combustion gas into the intake passageway at that time, the oxygen supply quantity control unit controls the air blowing device defined as the oxygen supply device, more specifically, the air blow fan to increase a quantity of oxygen flowing through the combustion gas introducing passageway, whereby the combustion gas containing a greater amount of oxygen can be sent to the intake passageway. Accordingly, as explained above, the starting characteristic of the internal combustion engine can be enhanced.

Furthermore, at the engine starting time or before the engine starting time, the fan rotational speed control unit properly sets the rotational speed of the fan higher than that of in operation other than the operation of starting the internal combustion engine, thereby making it feasible to ensure, for the engine intake air, the oxygen content enough to start up the internal combustion engine. Accordingly, even if the heater combustion gas, which is the exhaust gas, is introduced into the intake passageway at the engine starting time in which basically the engine speed is low or before the engine starting time in a state where the engine does not yet rotate, the internal combustion engine exhibits the preferable starting characteristic.

In addition, with the internal combustion engine, the lower the engine speed the less the intake air quantity. Hence, when the quantity of intake air is small, the quantity of fuel supplied to the combustion heater is reduced correspondingly to this small quantity of intake air, in which case at least the combustion gas does not become rich.

According to the present invention, the quantity of intake air is increased from the engine starting time or before the engine starting time. Therefore, if the quantity of fuel supply to the combustion heater is set equal to or smaller than the fuel supply quantity which is made when in the operation other than the engine starting time, the combustion gas becomes lean.

Accordingly, at the engine starting time with the low engine speed or before the engine starting time in the state where the engine does not yet rotate, if the quantity of fuel supply to the combustion heater is set equal to or smaller than the fuel supply quantity when the engine works other than at least the engine starting time, whereby the lean combustion gas is introduced into the intake passageway. Consequently, the oxygen content in the engine intake air increases, and the starting characteristic of the internal combustion engine can be further enhanced.

At the engine starting time or before the engine starting time and also introducing the combustion gas into the intake passageway at that time, the intake air quantity regulating unit reduces the intake air quantity, in other words, if the intake throttle valve is applied to the intake air quantity regulating unit, it follows that the intake throttle valve is closed. Hence, in this case, even if the combustion gas discharged from the combustion heater is forced to flow back through the intake passageway, the back flow is hindered by the intake throttle valve.

Further, when the intake throttle valve is applied to the intake air quantity control unit, the intake throttle valve is provided at a portion, between a connecting point at which the air supply passageway is connected to the intake passageway and a connecting point at which the combustion gas introducing passageway is connected to the intake passageway, of the intake passageway. Therefore, it never occurs that the combustion gas enters the combustion heater via the air supply passageway from the connecting point disposed more upstream than the intake throttle valve, at which the air supply passageway is connected to the intake passageway. Accordingly, deterioration in combustion (a rich accidental fire) in the combustion heater can be prevented.

At the engine starting time or before the engine starting time and also introducing the combustion gas into the intake passageway at that time, the combustion gas flows through the bypass passageway which bypasses the cylinders, and escapes to the exhaust system from the intake system. Hence, a rise in pressure (exhaust pressure) in the intake system can be restrained. Consequently, the back flow can be prevented more effectively.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Specific embodiments of an internal combustion engine having a combustion heater according to the present invention will hereinafter be described with reference to the accompanying drawings.

<First Embodiment>

A first embodiment of the present invention will be described referring to FIGS. 1 through 6.

Figure 1:
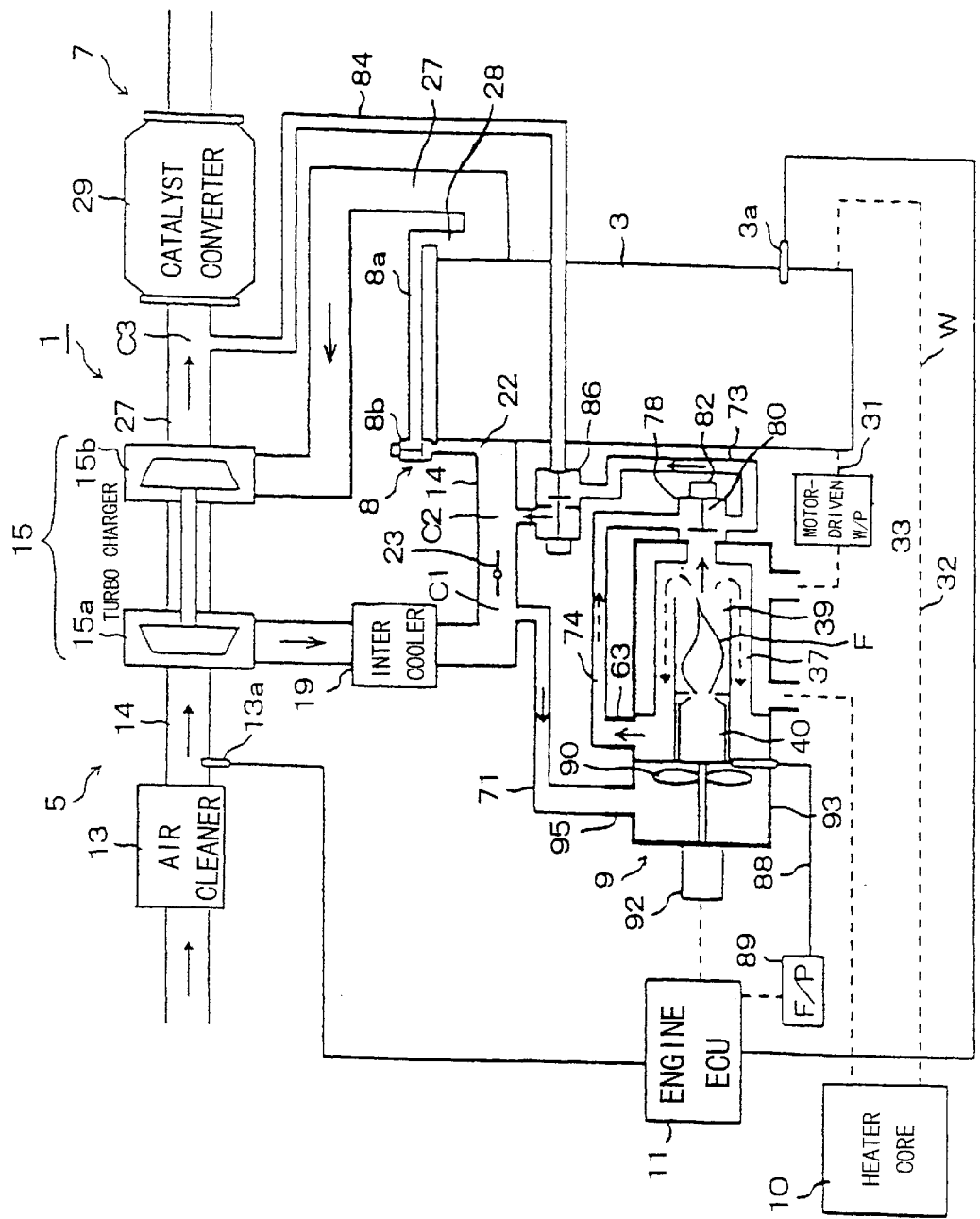
FIG. 1 is a schematic view showing a construction of an internal combustion engine having a combustion heater in a first embodiment of the present invention.

A diesel engine 1 (which will hereinafter be simply referred to as an [engine 1]) serving as an example of an internal combustion engine, and a whole structure thereof is schematically shown in FIG. 1.

The engine 1 includes an engine body 3 equipped with an unillustrated water jacket containing the engine cooling water, an air intake device 5 for supplying a plurality of unillustrated cylinders of the engine body 3 with the air needed for combustion in the engine, an exhaust device 7 for discharging into the atmospheric air an exhaust gas produced after an air-fuel mixture composed of the air supplied to the cylinders via the air intake device 5 and an engine fuel supplied by injection into the cylinders has been burned in combustion chambers in upper portions of the cylinders, an EGR (Exhaust Gas Recirculation) device 8 for restraining production of oxides of nitrogen by recirculating the exhaust gas toward the air intake device 5 from the exhaust device 7, a combustion heater 9 which is for introducing into the air intake device 5 of the engine 1 a combustion gas produced when the fuel is burned separately from the engine 1 in synchronization with an operation (synchronizing with cranking) of an unillustrated starter motor, which is an engine start assisting device attached to the engine body 3, and when the engine 1 is in a predetermined operation state, and the combustion heater 9 raises a temperature of the intake air by utilizing the heat of the thus introduced combustion gas, a heater core 10 of a car-room heater for raising a temperature of the car-room of a vehicle mounted with the engine 1, and an ECU 11, which is an engine controller, for controlling the whole engine 1.

Note that a case where "the engine 1 is in the predetermined operation state" implies when required to warm up the engine 1, and the time of requiring the warm-up implies a case of necessitating a speed-up of the warm-up with the combustion gas heat of the combustion heater such as when a heating value of the internal combustion engine itself is small because of a small consumption of the fuel, when a heat receiving quantity of the engine cooling water is small due to the small heating value, and when a temperature of the cooling water is too low to actuate the internal combustion engine even if an outside air temperature is a normal temperature higher than 15° C. Then, the case where the engine 1 is in the predetermined operation state is hereinafter referred to as a state wherein an operation execution condition of the combustion heater 9 is established.

In the engine body 3, a reciprocating motion of a piston in the cylinder is converted into a rotary motion of a crank shaft through a con-rod (connecting rod) for connecting the piston to the crank shaft.

Further, the crank shaft is, when in cranking, rotated by the starter motor.

An unillustrated injector serving as a fuel injecting device supplies the fuel by injection to the combustion chamber. Then, an injection timing is given after the combustion gas discharged from the combustion heater 9 has been introduced synchronizing with the operation of the starter motor, e.g., after the starter motor has made the crank shaft rotate a predetermined number of rotations.

Note that a fuel supply execution condition to supply the fuel into the combustion chamber by the injector is that a predetermined time elapsed after the starter motor has started rotating the crank shaft, or that a predetermined quantity of intake air is introduced into the cylinder after the starter motor has started rotating the crank shaft, or a combination of these two conditions.

The air intake device 5 includes an intake passageway 14 starting with an air cleaner 13 for filtering the outside air and terminating with an unillustrated intake port.

Disposed sequentially in and along the intake passageway 14 between the air cleaner 13 and the intake port are a compressor 15a of a turbo charger 15, an inter cooler 19 for cooling an intake air temperature raised by compression heat evolved when operating the compressor 15a, an intake manifold 22 which is an intake branch pipe, and other structures of the intake system.

Further, an intake throttle valve 23 serving as an intake air quantity regulating device for mainly regulating a quantity of the intake air flowing through the intake passageway 14, is provided between the inter cooler 19 and the intake manifold 22. Then, the combustion heater 9 is connected in bypass to a portion, positioned more downstream than the inter cooler 19, of the intake passageway 14.

The exhaust device 7 includes an exhaust passageway 27 starting with an unillustrated exhaust port of the engine body 3 and terminates with an unillustrated silencer. Exhaust system structures such as an exhaust manifold 28 which is an exhaust gas converging pipe, a turbine 15b of the turbo charger 15 and a catalyst converter 29 which is an exhaust gas purifying device, are disposed in and along the exhaust passageway 27 between the exhaust port and the silencer.

The EGR device 8 includes an EGR passageway 8a, through which to connect the intake passageway 14 to the exhaust passageway 27, thus bypasses the engine body 3 and functions to flow the exhaust gas from the exhaust port back to the intake side, and an EGR valve 8b for controlling a quantity of the exhaust gas flowing through the EGR passageway 8a.

The combustion heater 9 warms the engine cooling water with the combustion heat thereof, and the warmed engine cooling water is supplied to such elements as the heater core 10, the engine body 3, etc. of which temperatures are required to rise, thereby raising the temperatures of those elements.

Then, the engine 1 has a heat medium circulation passageway W through which an unillustrated engine water pump sends the engine cooling water warmed by the combustion heater 9 to the elements requiring temperature rise when the engine 1 operates.

The heat medium circulation passageway W includes a cooling water introducing passageway 31, through which the engine body 3 is connected to the combustion heater 9, for introducing the engine cooling water to the combustion heater 9 from the water jacket of the engine body 3, and a cooling water return passageway 32 for flowing the engine cooling water warmed by the combustion heater 9 back to the water jacket of the engine body 3 via the heater core 10.

Further, the cooling water introducing passageway 31 is provided with a motor-driven water pump 33. The motor-driven water pump 33, when operated, speeds up the circulation of the engine cooling water forced under pressure by the engine water pump to flow within the heat medium circulation passageway W. Alternatively, the circulation of the engine cooling water by the motor-driven water pump 33 effects operating the heater core 10 with the operation of the combustion heater 9 even during a stop of the engine.

Herein, the combustion heater 9 will be explained in detail with reference to FIGS. 1 to 3.

The combustion heater 9 embraces therein an intra-heater cooling water passageway 37 communicating with the cooling water introducing passageway 31 and the cooling water return passageway 32, and thus forming a part of the heat medium circulation passageway W.

The intra-heater cooling water passageway 37 has a cooling water introducing port 37a connected to the cooling water introducing passageway 31, and a cooling water discharge port 37b connected to the cooling water return passageway 32. Further, the intra-heater cooling water passageway 37 is a path extending around a combustion chamber 39 of the combustion heater 9.

The combustion chamber 39 is constructed of a combustion cylinder 40 serving as a combustion source for producing flames F, and a partition wall 41 for preventing the flames F from leaking outside by covering the combustion cylinder 40. The combustion cylinder 40 is covered with the partition wall 41, whereby the combustion chamber 39 is defined within the partition wall 41. Then, the partition wall 41 is also covered with an external wall 42 of the combustion heater 9.

Further, between an outer surface of the partition wall 41 and an inner surface of the external wall 42, an annular space is formed extending substantially over an entire area between these walls, and functions as the intra-heater cooling water passageway 37 described above.

Then, when the flames F are produced by operating the combustion heater 9 and during flowing of the engine cooling water through the intra-heater cooling water passageway 37, the engine cooling water receives the heat from the combustion chamber 39. Namely, the engine cooling water exchanges the heat with the high-heat combustion gas within the combustion chamber 39, and thus raises its temperature. Hence, the intra-heater cooling water passageway 37 may be said to be a heat exchange area.

Moreover, the combustion chamber 39 has air flow ports through which the air flows in and out of the combustion chamber 39. To be more specific, the combustion chamber 39 has, as the air flow ports, an air supply port 62 for supplying the combustion chamber 39 with the air for combustion, and combustion gas discharge ports 63, 65 for discharging the combustion gas from the combustion chamber 39.

The air supply port 62 is positioned in the combustion chamber opposite to the side on which the flames F come out from the combustion cylinder 40. Further, one port 63 of the combustion gas discharge ports 63, 65 is provided in a proper place, corresponding to the downstream side of the intra-heater cooling water passageway 37, within the combustion chamber 39, and the other combustion gas discharge port 65 is provided extending through both of the partition wall 41 and the external wall 42 in a state of facing the flames F on the side from which the flames F come out of the combustion cylinder 40.

The combustion gas discharge ports 63, 65 are connected to each other via a connecting pipe 74 extending in parallel to a longitudinal direction of the combustion heater 9.

Further, each of the air supply port 62 and the combustion gas discharge ports 63, 65 communicates with the intake passageway 14.

That is, the air supply port 62 is connected to the intake passageway 14, i.e., communicates with the intake passageway 14 via an air supply pipe 71 serving as an air supply passageway for taking the intake air as the air for combustion into the combustion heater 9 out of the intake passageway 14.

The combustion gas discharge port 63 communicates with the intake passageway 14 via the connecting pipe 74 and a combustion gas discharge pipe 73 for discharging the combustion gas to the intake passageway 14 from the combustion heater 9.

The combustion gas discharge port 65 communicates with the intake passageway 14 via the combustion gas discharge pipe 73.

A connecting point C1 connecting the air supply pipe 71 to the intake passageway 14 and a connecting point C2 connecting the combustion gas discharge pipe 73 to the intake passageway 14, are disposed in close proximity to each other in an area that these connecting portions have the same diameter, i.e., the same cross-sectional size of the intake passageway 14 so as not to cause a differential pressure between the connecting points C1 and C2.

The connecting point C2 is disposed more downstream than the connecting point C1. Further, the EGR passageway 8a is connected to the intake manifold 22 embraced by the intake passageway 14 at a portion more downstream than the connecting point C2.

Moreover, both of the connecting points C1 and C2 are positioned more downstream than the inter cooler 19, and the intake throttle valve 23 is provided between these two connecting points C1 and C2. In this case, the intake throttle valve 23 is located more upstream than the connecting point C2 at which the combustion gas is discharged to the intake passageway 14, and hence the intake throttle valve 23 is, even when the combustion gas is introduced to the intake passageway 14, difficult to suffer from a thermal damage by the combustion gas heat.

Further, the intake throttle valve 23 is constructed essentially to open and close for the purpose of controlling a quantity of the intake air flowing through the intake passageway 14, and, in addition, in the case of controlling an ignition for producing latent flames in the combustion heater 9, it is controlled to open and close according to the operation state of the-combustion heater, such as, during a period of time until the latent flames are grown into the flames after the latent flames have been produced, at the time of generating the flames, and the like.

The EGR valve 8b of the EGR device 8 is also controlled to open and close corresponding the above-mentioned opening/closing control of the intake throttle valve 23.

For example, when operating the combustion heater 9 before starting the engine, the combustion gas discharged to the intake passageway 14 from the combustion heater 9 flows via the EGR passageway 8a by opening the EGR valve 8b, and is thus discharged to the exhaust passageway 27.

Furthermore, the EGR valve 8b is kept closed when the engine is still in the low-temperature state even after starting the engine. This is because the EGR device 8 exhibits the effect of decreasing the oxides of nitrogen, as the exhaust gas recirculation device, only when the engine 1 reaches a high temperature.

Note that the intake throttle vale 23 is provided preferably in the position between the connecting points C1 and C2 in terms of preventing the thermal damage to the intake throttle valve 23, but it may also be provided downstream of the connecting point C2 in terms of a relationship of arrangement with other structural members.

The combustion gas discharge pipe 73 has a valve device 78 for controlling the opening/closing of the combustion gas discharge port 65. Then, the combustion gas discharge pipe 73 is connected via this valve device 78 to the combustion heater 9.

The valve device 78 includes a valve 80 for opening and closing the combustion gas discharge port 65, and an actuator 82 for actuating the valve 80. A quantity of the combustion gas introduced from the combustion gas discharge port 65 of the combustion heater 9 directly into the combustion gas discharge pipe 73 and further to the intake passageway 14, is regulated according to a degree of open/close of the valve 80.

That is, when the valve 80 is fully opened, a large proportion of the combustion gas flows to the combustion gas discharge pipe 73 via the combustion gas discharge port 65. Then, when fully closed, the combustion gas flowing toward the combustion gas discharge port 65, with a flow path from the combustion gas discharge port 65 to the combustion gas discharge pipe 73 being blocked, flows toward the combustion gas discharge port 63, and almost all the combustion gas flows to the combustion gas discharge pipe 73 via the connecting pipe 74 from the combustion gas discharge port 63.

Further, if the valve 80 is half opened or opened to some degree, a flow rate of the combustion gas flowing to the combustion gas discharge pipe 73 via the combustion gas discharge port 63 relative to a flow rate of the combustion gas flowing to the combustion gas discharge pipe 73 via the combustion gas discharge port 65, is determined according to a degree of opening of the valve 80.

Moreover, a rate of an introduction quantity of the combustion gas flowing out of the combustion gas discharge ports 63, 65 into the intake passageway 14, is controlled based on, e.g., an outside air temperature or a temperature of the engine cooling water, or both of these temperatures. The reason why controlled based on both of these temperatures is that both of these temperatures are low in many cases in the low temperature operation, but in some cases, the temperature of the engine cooling water might be high even when the outside air temperature is low in the state where, for instance, the engine 1 is just stopped.

To exemplify how much the valve 80 is opened, for example, if the outside air temperature is low, the degree of opening of the valve 80 is increased so that the flow rate of the combustion gas flowing to the combustion gas discharge port 65 is made larger than flowing to the combustion gas discharge port 63. As to which combustion gas discharge port, 63 or 65, is used for discharging the combustion gas, will be explained later in due course.

Further, the outside air temperature is detected by a temperature sensor 13a provided downstream in close proximity to the air cleaner 13, and the temperature of the engine cooling water is detected by a temperature sensor 3a provided at the water jacket.

A pipe 84 diverges midways of the combustion gas discharge pipe 73, more specifically, diverges at a point, closer to the intake passageway 14, of the combustion gas discharge pipe 73. Hence, this pipe 84 is called a branch pipe 84.

The branch pipe 84 extends to the exhaust passageway 27 so as to bypass the engine body 3, and is connected to the exhaust passageway 27 at a point C3 which is in the vicinity and upstream of the catalyst converter 29 provided in the exhaust passageway 27.

Note that the branch pipe 84 may be extended through inside the engine body 3 so that the branch pipe 84 bypasses the cylinders.

In any case, the branch pipe 84 may be said to be a bypass passageway which bypasses the cylinders. It is to be noted that a technical concept of this bypass passageway bypassing the cylinders can be applied to the EGR passageway 84a.

A three-way switching valve 86 is attached to an intersection between this branch pipe 84 and the combustion gas discharge pipe 73.

The three-way switching valve 86 is a valve for selectively switching the flow of the combustion gas to let it flow directly through the combustion gas discharge pipe 74 toward the intake passageway 14 or through the branch pipe 84.

A flow direction of the combustion gas flowing to the three-way switching valve 86 is switched over by operating the three-way switching valve 86, thereby introducing the combustion gas into the intake passageway 14 or the exhaust passageway 27.

Note that flowing the combustion gas to the intake passageway 14 by switching the three-way switching valve 86 may be called "switching the three-way switching valve 86 to the intake side", while flowing the combustion gas to the exhaust passageway 27 may be called "switching the three-way switching valve 86 to the exhaust side".

When flowing the combustion gas to the intake passageway 14 by switching the three-way switching valve 86 to the intake side, the combustion heater 9 is substantially connected to the intake passageway 14 through the combustion gas discharge pipe 73. With this connection, the combustion gas is introduced into the intake passageway 14 from the combustion heater 9.

Further, when flowing the combustion gas to the exhaust passageway 27 by switching the three-way switching valve 86 to the exhaust side, the combustion heater 9 is substantially connected to the exhaust passageway 27 through the branch pipe 84 and a part of the combustion gas discharge pipe 73. With this connection, the combustion gas is introduced into the exhaust passageway 27 of the engine 1 from the combustion heater 9.

The three-way switching valve 86 is capable of switching the flow of the combustion gas introduced into the intake passageway 14 to the exhaust passageway 27 and vice verse, i.e., switching the flow of the combustion gas introduced into the exhaust passageway 27 to the intake passageway 14, and may therefore be referred to as an introduction gas switching device.

On the other hand, the combustion cylinder 40 has therein an unillustrated wick serving as a fuel evaporation member. Further, as shown in FIG. 1, a fuel introducing passageway 88 for introducing the fuel from outside is connected to the combustion cylinder 40. The fuel introducing passageway 88 is connected to a fuel pump 89, and, upon receiving a pump pressure of the fuel pump 89, the fuel is injected to the wick of the combustion cylinder 40 from the fuel introducing passageway 88. The injected fuel is evaporated in the air flowing in from the air supply pipe 71.

Further, the combustion cylinder 40 includes a glow plug (not shown) for igniting the vapor fuel evaporated in the wick. This glow plug is electrically conducted by switching ON an ignition switch IG.

Furthermore, the quantity of the fuel discharged from the fuel introducing passageway 88 varies according to the operation state of the combustion heater 9.

Then, the external wall 42 of the combustion heater 9 is fitted with a housing 93, which embraces an air blow fan (preferably, a turbo type air blow fan) 90 serving as an air blowing device including a motor 92 as a driving unit and a fan 90a rotationally driven by the motor 92, on the side opposite to the flames F emitting side of the combustion cylinder 40.

The housing 93 has an air intake port 95 for taking in the air from outside, and the air supply pipe 71 is connected to this air intake port 95. An interior space S of the housing 93 also communicates with the air supply port 62. Hence, the air supply port 62 is indirectly connected via the interior space S to the air supply pipe 71.

Then, when the fan 90a is rotated by the motor 92, the air is introduced via the air supply pipe 71 into the housing 93 from the intake passageway 14. The air introduced into the housing 93 is supplied as the air for combustion to the combustion cylinder 40 from the air supply port 62 via the interior space S.

The vapor fuel evaporated in the wick is, as described above, burned with the combustion air, thereby producing the flames F. Then, the combustion gas emitted from the flames F thereafter flows through the combustion gas discharge pipe 73 from the combustion heater 9, and is introduced directly to the intake passageway 14 or to the exhaust passageway 27 via the branch pipe 84 by the switching operation of the three-way switching valve 86. Hence, the combustion gas discharge pipe 73 may be called a combustion gas introducing passageway.

Further, the higher the rotational speed of the air blow fan 90 of the combustion heater 9 the greater the quantity of ventilation (air current) produced in the combustion gas discharge pipe 73. Accordingly, if a magnitude and a force of the flames are the same, a ratio of oxygen content in the combustion gas increases in proportion to the rotational speed of the fan 90a. Therefore, the combustion gas having become lean is discharged from the combustion heater 9.

Hence, the air blow fan 90 may be referred to as an oxygen supply device for supply the oxygen. The rotational speed of the air blow fan 90 is made variable by the ECU 11 controlling the motor 92, at which time an oxygen supply quantity is controlled by a quantity of air produced by the air blow fan 90, and hence the ECU 11 may be called an oxygen supply quantity control unit. Further, the ECU 11 controls the rotational speed of the fan 90a by controlling the operation of the motor 92 of the air blow fan 90, and may also be called a fan rotational speed controller.

The ECU 11, at the engine starting time and also the combustion gas emitted from the combustion heater 9 is introduced into the intake passageway 14, performs augmentation control of increasing the oxygen content in the engine intake air by use of the air blow fan 90 defined as the oxygen supply device. Then, the ECU 11 replenishes the oxygen under the augmentation control of increasing the oxygen content in the engine intake air, as the oxygen content is decreased with the introduction of the combustion gas into the intake passageway 14 via the combustion gas discharge pipe 73 which is the combustion gas introducing passageway. The engine intake air is thereby made effective in enabling the engine 1 to operate independently without depending upon the starter motor, in other words, the engine intake air turns out an oxygen-contained intake air (of which an oxygen content is, e.g., 10% or greater) effective in enhancing the starting characteristic.

The "engine starting time" given herein implies a state where the starter motor rotates the crank shaft and thereby the piston makes a reciprocating motion within the cylinder, viz., a state where the engine 1 is in the cranking state and is therefore in a state of being ready to be capable of independently starting its operation eventually without depending on the starter motor.

The combustion heater 9 described above operates as follows when starting the engine 1 and also when there arises a necessity for raising the temperature of the engine cooling water in order to speed up the warm-up of the engine body 3 and to enhance a performance of the heater core 10 by introducing the combustion gas from the combustion heater 9 into the intake passageway 14.

Figure 2:
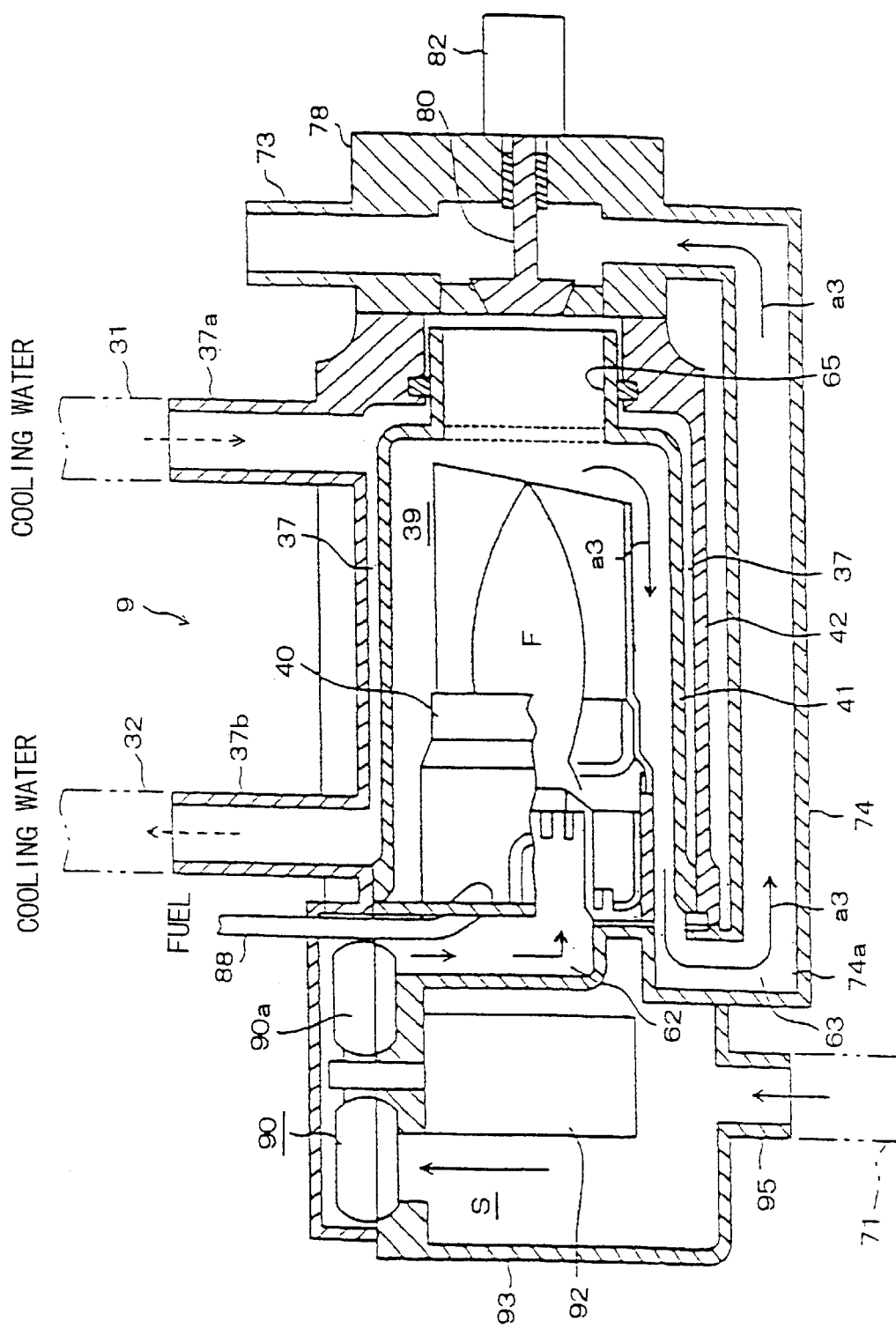
FIG. 2 is a sectional view showing an operation state of the combustion heater shown in FIG. 1.

To begin with, as shown in FIG. 2, the valve 80 is closed by the operation of the valve device 78, and as a result the combustion gas discharge port 65 is closed. Further, as described above, a part of the intake air flowing through the intake passageway 14 is introduced into the combustion cylinder 40 of the combustion heater 9 via the air supply pipe 71 by operating the air blow fan 90.

Moreover, the fuel pump 89 pumps up the fuel from the fuel tank (not shown), and discharges the fuel to the wick of the combustion cylinder 40 from the fuel introducing passageway 88.

Further, at the engine starting time, the engine cooling water in the water jacket of the engine 1 is forced under pressure to flow through the intra-heater cooling water passageway 37 by operating the motor-driven water pump 33.

In addition, the glow plug ignites the air-fuel mixture composed of the intake air supplied to the combustion cylinder 40 by the air blow fan 90 and the vapor fuel which is the fuel supplied to the combustion cylinder 40 from the fuel introducing passageway 88 and evaporated in the wick, whereby the flames F are produced in the combustion cylinder 40 and the combustion thus starts.

The high-temperature combustion gas evolved by the combustion flows through the combustion chamber 39 toward the combustion gas discharge port 63 along the air current produced by the rotations of the air blow fan 90, and is thereafter discharged to the connecting pipe 74 connected to the combustion gas discharge port 63 (see an arrow a3 in the solid line in FIG. 2).

Then, the engine cooling water forced to be sent under pressure by the motor-driven water pump 33 to the intra-heater cooling water passageway 37 of the combustion heater 9 via the cooling water introducing passageway 31 from the water jacket, flows through the intra-heater cooling water passageway 37 in circulation along the entire outer surface of the partition wall 41, during which its temperature rises while absorbing the combustion heat. In other words, the heat exchange takes place over the whole heat exchange area of the intra-heater cooling water passageway 37.

Figure 3:
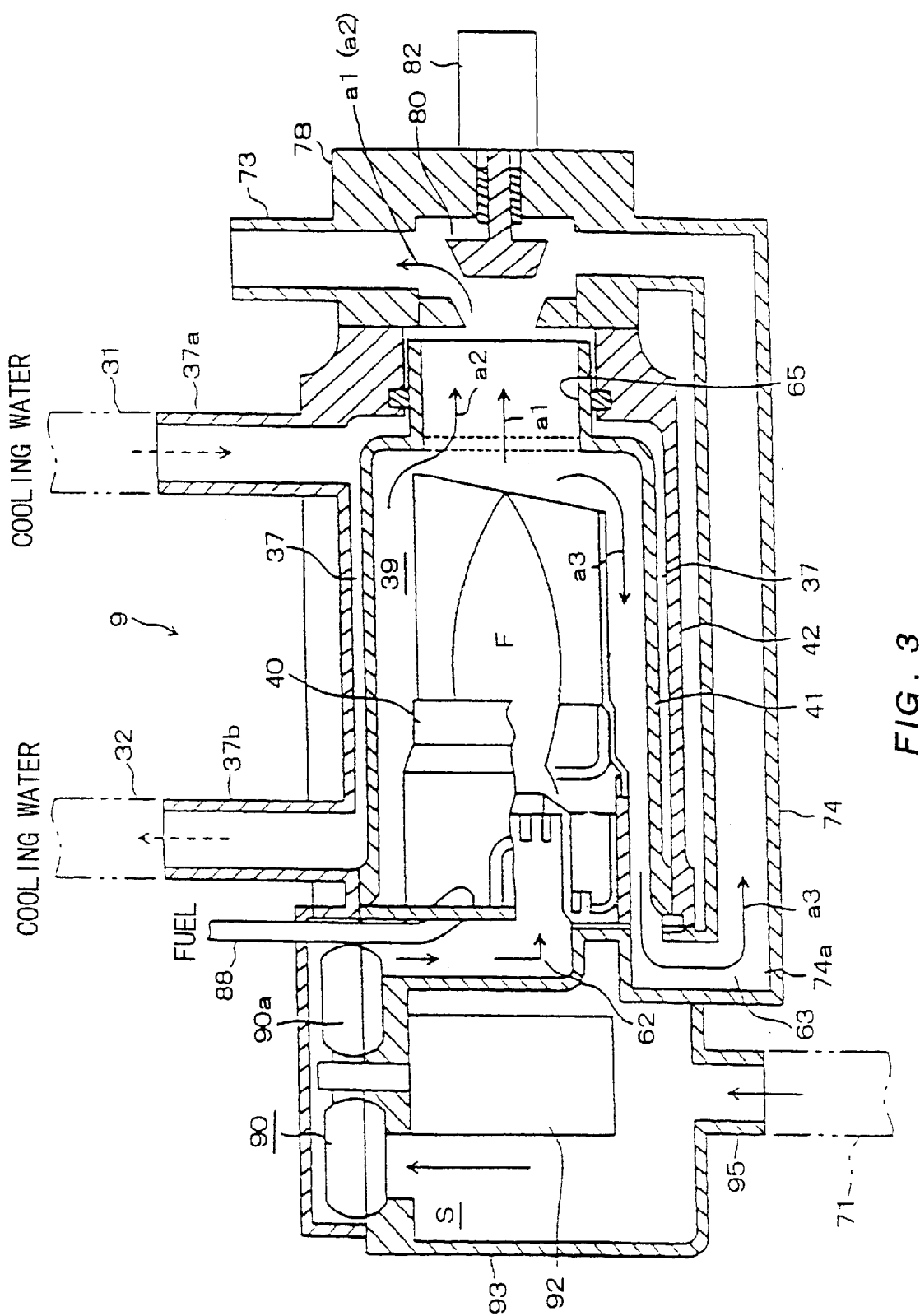
FIG. 3 is a sectional view showing another operation state of the combustion heater.

The engine cooling water having absorbed the combustion heat is discharged to the cooling water return passageway 32 from the intra-heater cooling water passageway 37 in order to flow to the heater core 10 (see an arrow in broken lines in FIGS. 2 and 3, respectively).

Thereafter, the engine cooling water discharged from the combustion heater 9 flows back to the water jacket of the engine body 3 via the cooling water return passageway 32 to which the heater core 10 belongs.

In the heater core 10, a portion of the heat held by the engine cooling water is subjected to heat exchange with the air for warming, whereby a temperature of the air for warming rises. As a result, hot air blows into the car room.

Thus, the engine cooling water bearing the high heat by its being warmed by the combustion heater 9 flows to the water jacket of the engine body 3 and further to the heater core 10.

Next, there arises a necessity for raising early the temperature of the intake air of the engine 1 or of the catalyst converter 29 when the engine 1 is in the predetermined operation state described above as well as starting up the engine, then the combustion heater 9 operates as follows.

As shown in FIG. 3, the valve 80 is opened by operating the valve device 78, and as a result the combustion gas discharge port 65 opens. Subsequently, the fan 90a of the air blow fan 90 is rotated by the motor 92, thereby supplying the combustion cylinder 40 with some of the intake air flowing through the intake passageway 14.

Further, the fuel pump 89 pumps up the fuel from within the fuel tank and supplies the thus pumped up fuel to the wick of the combustion cylinder 40 from the fuel introducing passageway 88.

Then, the glow plug of the combustion cylinder 40 is electrically conducted.

The glow plug ignites the air-fuel mixture composed of the intake air supplied by the air blow fan 90 and the vapor fuel which is the fuel supplied to the combustion cylinder 40 from the fuel introducing passageway 88 and evaporated in the wick, whereby the flames are produced in the combustion cylinder 40 and the combustion takes place.

Further, the high-temperature combustion gas evolved by the combustion of the fuel in the combustion cylinder 40 flows through the combustion chamber 39 toward the combustion gas discharge port 65 along the air current produced by the rotations of the air blow fan 90, and is thereafter discharged to the combustion gas discharge pipe 73 from the combustion gas discharge port 65.

At this time, according to the degree of opening of the combustion gas discharge port 65, a portion of the combustion gas before the combustion gas flowing via the intra-heater cooling water passageway 37, and the combustion gas flowing through a portion of the area in the intra-heater cooling water passageway 37, are both discharged to the combustion gas discharge pipe 73.

Note that "a portion of the combustion gas before the combustion gas flowing via the intra-heater cooling water passageway 37" means the combustion gas flowing toward the combustion gas discharge port 65 almost without contacting the inner surface of the partition wall 41, and thereby not subjected to heat exchange (see, e.g., an arrow a1 in FIG. 3). "The combustion gas flowing through a portion of the area in the intra-heater cooling water passageway 37" means the combustion gas which makes contact with a portion of the inner surface of the partition wall 41 and thereby subjected to a small amount of heat exchange (see, e.g., an arrow a2 in FIG. 3).

The combustion gas includes the combustion gas flowing toward the combustion gas discharge port 63 when the combustion gas discharge port 65 opens and subjected to the heat exchange (see an arrow a3 in FIG. 3). A quantity of this heat-exchanged combustion gas is, however, smaller than the combustion gas flowing toward the combustion gas discharge port 65. The reason is as follows.

Namely, when the valve 80 of the valve device 78 is opened, a pressure that is absolutely or substantially the same as a pressure P0 of the combustion gas at the combustion gas discharge port 65 in the combustion chamber 39, is applied to inside the valve device 78. On the other hand, a pressure P1 of the combustion gas arriving at a starting end 74a of the connecting pipe 74 via the combustion chamber 39 receives a pressure loss during flowing of the combustion gas through the combustion chamber 39 and is therefore smaller than the pressure P0. Hence, the combustion gas flowing via the combustion chamber 39 and consequently having the pressure P1, is difficult to flow toward the intake passageway 14 via the connecting pipe 74. Therefore, the combustion gas having the pressure P0 higher than the pressure P1 flows preferentially via the combustion gas discharge pipe 73 toward the intake passageway 14.

The high-temperature combustion gas discharged to the combustion gas discharge pipe 73 via the combustion gas discharge port 65, eventually arrives at the three-way switching valve 86. Subsequently, the combustion gas diverges to a path unclosed by the three-way switching valve 86. That is, the combustion gas flows out to the intake passageway 14 straight via the combustion gas discharge pipe 73, or flows out to the exhaust passageway 27 via the branch pipe 84.

Herein, the combustion gas discharged from the combustion gas discharge port 65 is, as described above, either not heat-exchanged with the engine cooling water in the combustion heater 9, or, if heat exchanged, a quantity of the heat exchange is small. Therefore, the combustion gas discharged from the combustion gas discharge port 65 has a considerably higher temperature than the combustion gas which has been discharged from the combustion gas discharge port 63 and heat-exchanged with the engine cooling water. Thus, for a terminological convenience, the combustion gas flowing toward the combustion gas discharge port 63 and thereby heat-exchanged with the engine cooling water, is referred to as a post-water-cooling combustion gas, while the combustion gas flowing toward the combustion gas discharge port 65 and thereby not subjected to heat-exchange is called a pre-water-cooling combustion gas.

Further, the combustion gas discharge port 65 is provided with the valve device 78 for controlling the combustion gas discharge port 65 to open and close as described above. Hence, such discharge port 65 for directly taking out the combustion gas may be called a combustion gas discharge port with a direct take-out valve, and the combustion heater 9 having the thus structured combustion gas discharge port 65 may be termed a combustion heater with a combustion gas direct take-out valve.

Then, as described above, the pre-water-cooling combustion gas is supplied to the intake passageway 14 or to the connecting point C3 positioned upstream of the catalyst converter 29 in the exhaust passageway 27, whereby the temperature of the intake air or of the catalyst converter 29 can be raised early.

A period of time for electrically conducting the glow plug differs according to a temperature of the engine cooling water before conduction of the glow plug. For instance, if a temperature of the outside air is low, the temperature of the engine cooling water is also low, and hence a temperature of the whole combustion heater 9 with the engine cooling water embraced in the intra-heater cooling water passageway 37 is likewise low. Therefore, a temperature of the wick of the combustion heater 9 is also low.

When the temperature of the wick is low, the fuel is difficult to evaporate when the fuel is introduced, and hence the fuel is hard to ignite. Namely, the latent flame is formed with a difficulty. Then, as described above, when the outside temperature is low, and the temperature of the combustion heater 9 is also low, the temperature of the wick is likewise low, and therefore there is set a state where the fuel supplied to the wick is easy to evaporate by pre-heating the wick, and more essentially the combustion heater 9 is easy to ignite.

What warms up the wick by pre-heating is the glow plug provided in the combustion heater 9. Then, when the temperature of the engine cooling water becomes lower, the wick is not warmed up unless the period of time for conducting the glow plug is set longer correspondingly, whereas if the temperature of the engine cooling water becomes higher, the wick is warmed up in a shorter period of conduction time.

Figure 4:
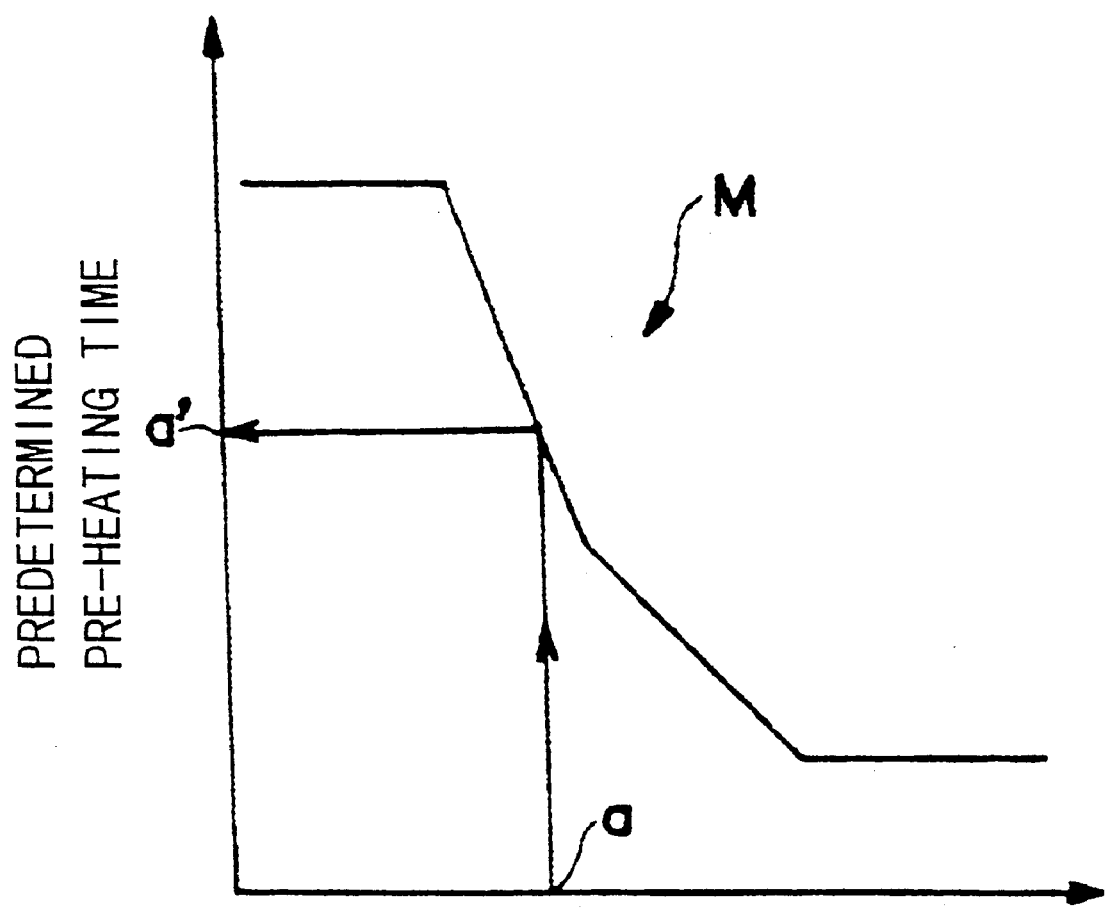
FIG. 4 is a graph showing a predetermined pre-heating time versus an engine cooling water temperature.

Then, a necessary pre-heating time by the glow plug is obtained based on the temperature of the engine cooling water for obtaining a suitable wick temperature by use of a map M as shown in FIG. 4. This necessary pre-heating time differs depending on the temperature of the engine cooling water. Hence, the necessary pre-heating time is referred to as a predetermined pre-heating time determined based on the temperature of the engine cooling water before conducting the glow plug (which will hereinafter be simply called the "predetermined pre-heating time").

That is, the map M is a graph of the predetermined pre-heating time versus the engine cooling water temperature, in which the predetermined pre-heating time is on the vertical axis and the temperature of the engine cooling water is on the horizontal axis.

The map M clarifies that when the temperature of the engine cooling water is, e.g., a° C., the predetermined pre-heating time is set to, e.g., a'second(s), whereby the wick temperature (in other words, a temperature in the combustion chamber 39) can be made suitable for performing the ignition.

It can be understood from the map M that when the temperature of the engine cooling water is high, as described above, a short pre-heating time is suffice, and, if low, a long pre-heating time is needed.

It is to be noted that after the lapse of the predetermined pre-heating time, a lamp fitted to a cockpit is lit up in order to notify a driver of a completion of pre-heating of the combustion heater 9. Upon lighting the lamp, the driver turns ON an unillustrated starter switch. That is, the starter switch is turned ON. This lamp is therefore termed a starter switch-ON permission lamp. The starter motor is operated by switching ON the starter switch with the result that the engine 1 starts, and the combustion heater 9 starts operating by igniting the vapor fuel of the combustion heater 9 at the same time.

Herein, referring back to FIG. 1.

The ECU 11 is constructed of a central processing unit CPU, a read-only memory ROM, a random access memory RAM, an input interface circuit, and an output interface circuit, which are connected to one another through a bidirectional bus. Then, a variety of sensors are, whether illustrated or not, connected via electric wires to the input interface circuit. Connected via electric wires to the output interface circuit are the EGR valve 8b, the motor-driven water pump 33, the glow plug of the combustion cylinder 40, the valve device 78, the three-way switching valve 86, the fuel pump 89 and the motor 92.

What can be exemplified as the sensors connected to the input interface circuit may be, in addition to the temperature sensors 3a and 13a, an unillustrated combustion gas temperature sensor serving as an ignition sensor for detecting, based on the combustion gas temperature, whether the combustion heater 9 is ignited or not, an airflow meter attached to the intake passageway 14, a catalyst temperature sensor attached to the catalyst converter 29, an accelerator position sensor fitted to an accelerator pedal or to an accelerator lever which operates interlocking with the accelerator pedal, an ignition switch, a starter switch, etc. These sensors output electric signals corresponding to detected values and transmit these signals to the ECU 11.

Note that parameters of the temperature sensors and of various other sensors are temporarily stored in the random access memory RAM of the ECU 11, and called as the necessity arises. Further, the map 1 is stored in the read-only memory ROM and likewise called according to the necessity.

Further, the CPU of the ECU 11 operates according to the respective parameters of various sensors, thereby controlling the combustion state of the combustion heater 9. In other words, the CPU controls a force, a magnitude and a temperature of the flames in the combustion heater 9. Then, under this control, the temperature of the exhaust gas (combustion gas) from the combustion heater 9 is controlled.

Based on the output signal values from the above-described various sensors, the CPU judges which operation state the engine 1 is in. Then, the CPU, based on a result of the judgement, controls the whole operation of the engine 1 including controlling of fuel injection, etc.

For controlling the output of the combustion heater 9 at the same time, the CPU controls the rotational speed of the air blow fan 90 as described above, and also controls the quantity of the fuel supplied from the fuel introducing passageway 88. Further, the CPU controls the operations of the valve device 78, the three-way switching valve 86, etc.

Figure 5:
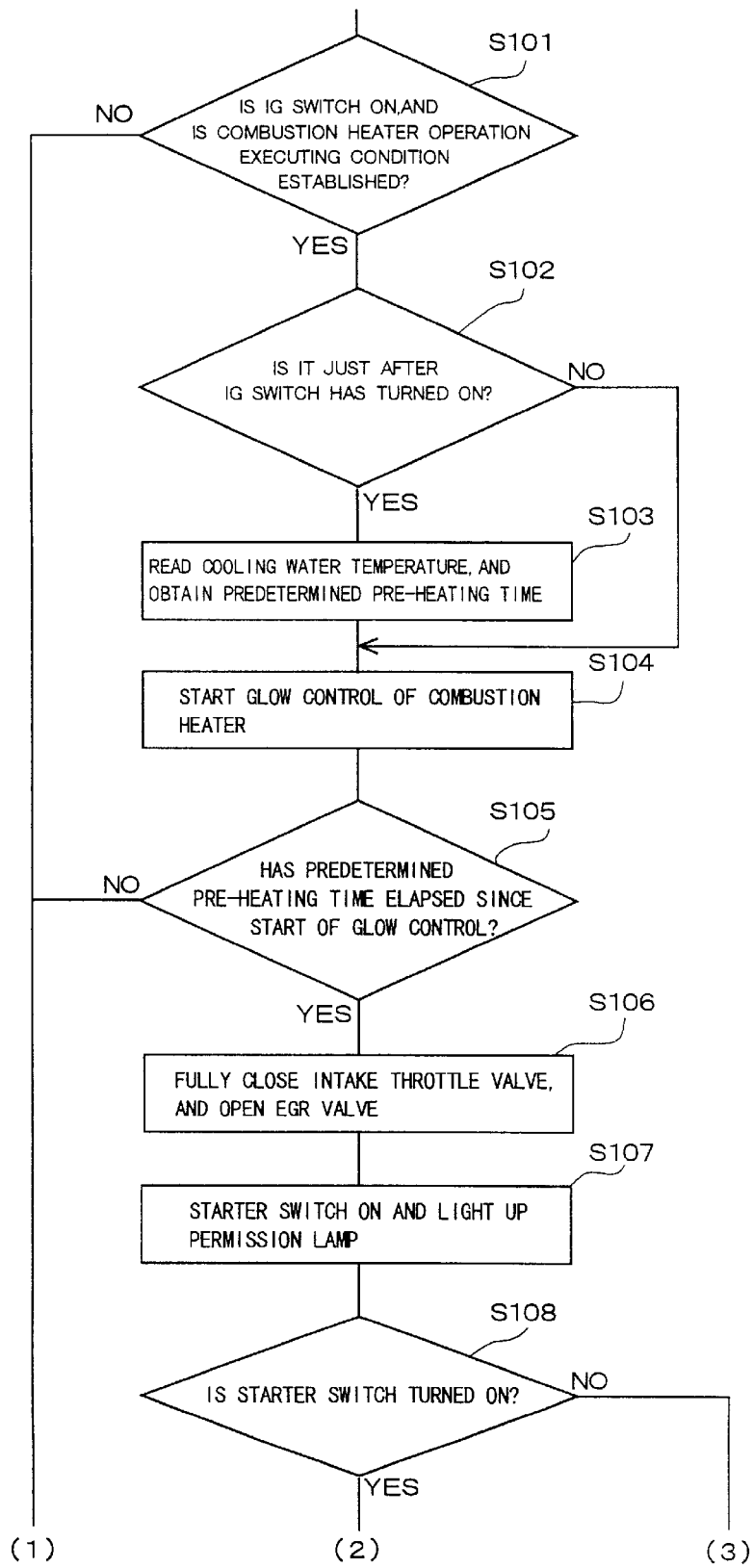
FIG. 5 is a diagram showing a part of a flowchart of an engine start control execution routine.
Figure 6:
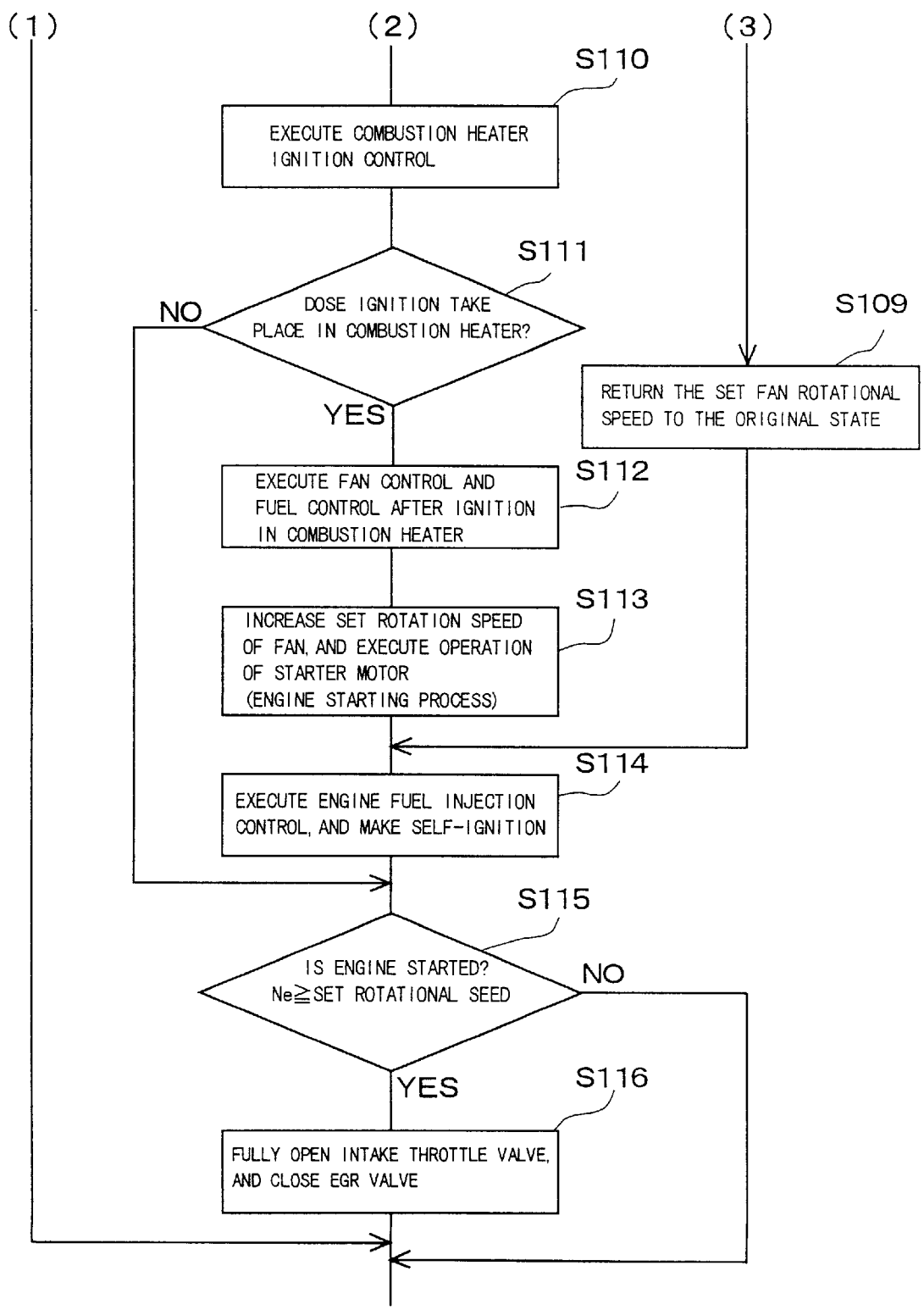
FIG. 6 is a diagram showing another part of the flowchart continued from FIG. 5.

Next, a program for actualizing a start control execution routine of the engine 1 is described referring to flowcharts in FIGS. 5 and 6. This routine serves for starting the engine 1, and hence it is assumed that the combustion gas be introduced to the intake passageway 14 via the combustion gas discharge pipe 73.

This program consists of steps 101–116 which will be described hereinafter. The program composed of these steps is stored in the ROM of the ECU 11 and called and repeated as the necessity arises. All the processes in the respective steps are executed by the CPU of the ECU 11.

Note that FIGS. 5 and 6 should be originally given en bloc on the same sheet, but are separated because of a limited space on the sheet. The reference numerals (1)–(3) shown in FIG. 5 correspond to the same numerals (1)–(3) shown in FIG. 6, which indicates where the processing is shifted to. The process of the route (1) in FIG. 5 shifts to the route (1) in FIG. 6 and continues as it is in FIG. 6.

It is determined in S101 whether or not the operation executing condition of the combustion heater 9 is established such as the engine 1 is in the cold state, and if so, the output signal value of the ignition switch IG is ON.

If determined to be affirmative in S101, the processing proceeds to the next step S102, whereas if determined to be negative, this routine is finished. The present invention is designed to facilitate the start of the engine even when the internal combustion engine is the low temperature state. Therefore, if determined to be negative in S101, this indicates a case where the engine 1 is not to be started, or a case where the internal combustion engine is not in the low temperature state, namely, for example, the warm-up of the engine is sufficient, and is therefore out of the object of the present invention.

It is determined in S102 whether or not the ignition switch is just after it has been switched ON. The timing of "just after" is for determining whether or not this routine is a routine that should be executed at the engine starting time.

If determined to be affirmative in S102, the processing proceeds to S103, whereas if determined to be negative, the processing diverges to S104.

In S103, a temperature of the engine cooling water before conducting the glow plug is read, and, based on the read temperature value (which is a temperature value "a" in the case of FIG. 4), the predetermined pre-heating time (the predetermined pre-heating time a' in the case of FIG. 4) is obtained from the map M.

In S104, aiming at the predetermined pre-heating time obtained in S103, the conduction of the glow plug is started. "The start of conduction of the glow plug aiming at the predetermined pre-heating time" may be, for convenience, called "starting control of glow of the combustion heater".

It is determined in S105 whether or not the predetermined pre-heating time actually elapses since the start of conduction of the glow plug. If determined to be affirmative in S105, the processing proceeds to S106, whereas if determined to be negative, this routing is finished.

In S106, the intake throttle valve 23 is fully closed, and the EGR valve 8b of the EGR passageway 8a is opened.

If the combustion heater 9 operates in a state where the intake throttle valve 23 is not fully closed, the EGR valve 8b of the EGR passageway 8a is not opened and the engine 1 is not yet started, the combustion gas discharged from the combustion heater 9 flows to the intake passageway 14 via the combustion gas discharge pipe 73, and the intake air becomes the intake air containing the combustion gas, thereby causing a differential pressure in the intake passageway 14. Due to this differential pressure, the intake air containing the combustion gas flows toward upstream through the intake passageway 14, i.e., a so-called back flow occurs.

In S106, however, the intake throttle valve 23 is fully closed while the EGR valve 8b is opened, and hence the back flow is restrained, with the result that the combustion gas flows to the exhaust side out of the intake side via the EGR passageway 8a.

Further, if the back flow can be prevented, the intake throttle valve 23 is not necessarily fully closed.

With the process in S106, there comes to a state where the intake throttle valve 23 is fully closed, while the EGR valve 8b is opened. Therefore, a process in the next step S107 is light up the starter switch ON permission lamp which is a notification lamp for notifying the driver that the engine 1 is in the state where the back flow does not occur even when the combustion gas is introduced into the intake passageway 14 by operating the starter motor upon switching ON the starter switch and by operating the combustion heater 9, at the same time.

It is determined in S108 whether or not the starter switch for operating the starter motor is actually switched ON. If determined to be affirmative in S108, the processing proceeds to S110, whereas if determined to be negative, the processing diverges to S109.

In S110, the ignition control for forming the latent flame in the combustion heater 9 is performed.

The rotational speed of the fan and the quantity of the fuel supply to the combustion heater 9 at that time, may be set enough to effect the ignition in the combustion heater 9, and therefore those values are smaller than the values needed for growing the latent flame into the flames.

In S111, the combustion gas temperature sensor which is an ignition sensor determines whether or not the ignition actually takes place in the combustion heater 9. If determined to be affirmative in S111, the processing proceeds to step S112, whereas if determined to be negative, the processing diverges to S115.

In S112, because of being in the state where the combustion heater 9 has, as explained in S111, already been ignited as a premise (see S110), there are ensured the rotational speed of the fan and the quantity of the fuel supply to the combustion heater 9 which are required for growing the latent flame into the flames. Note that this may be referred to as an execution of the fan control and the fuel control after the ignition in the combustion heater 9.

In S113, the set rotational speed of the fan is increased to higher than the rotational speed of the fan controlled in S112.

The increased rotational speed of the fan is a value enough not to cause an accidental fire in the combustion heater 9, and is also a value set higher than a predetermined rotational speed of the fan which is preset as a rotational speed of the fan in the operation, other than the starting time of the engine 1, namely, when the engine is kept working. This rotational speed of the fan is a value obtained based on a test conducted for every engine.

It is to be noted that the combustion heater 9 is connected to the intake passageway 14 via the air supply pipe 71 and the combustion gas discharge pipe 73, and the connecting point C1, at which the pipe 71 is connected to the intake passageway 14, is positioned more upstream than the connecting point C2 at which the pipe 73 is connected to the intake passageway 14. Therefore, when increasing the rotational speed of the fan, the fan 90a gains a much stronger force of sucking the air for combustion and comes to suck even the combustion gas introduced into the intake passageway 14. This might accelerate the back flow described above, however, since the intake throttle valve has already been closed (see S106), there is no possibility of causing the back flow. Further, the EGR valve is unclosed to make the EGR passageway 8a open, and consequently, the combustion gas escapes into the exhaust passageway 27 from the intake passageway 14. It is therefore feasible to restrain a rise in pressure (exhaust pressure) in the intake passageway 14. Hence, the back flow can be prevented more effectively.

Moreover, in S113, the start execution control of the engine 1 is carried out by operating the starter motor. When implementing the start execution control of the engine 1, i.e., when the engine starting operation is effected in S113, the crank shaft starts to rotate by the starter motor.

In S114, the self-ignition takes place while executing the injection control of the engine fuel injected from an injector into the combustion chamber of the engine 1. This is for enabling the engine 1 to operate by itself without depending on the starter motor.

In S115, whether or not the engine actually starts is determined from knowing whether or not the engine 1 rotates at a speed equal to or higher than a predetermined engine rotational speed Ne. If determined to be affirmative, the processing proceeds to S116, whereas if determined to be negative, this routine is finished.

Note that the processing proceeds to S115 from S111 regardless of whether determined to be affirmative or negative therein. If affirmative, however, this is the first determination in S111 after turning ON the starter switch, and, if negative, this is the determination made in S111 when the routine has already made one or more loops according to the necessity.

In S116, since the engine 1 has already worked, the intake throttle valve 23 closed in S106 is fully opened, and likewise the EGR valve opened in S106 is closed.

S116 is a step to which the processing proceeds from S115 where the affirmative determination has been made. Thus, at the stage where the processing having shifted to S116, the engine 1 is already in the state of operating independently. Accordingly, the flow of the intake air flowing through the intake passageway 14 toward the cylinders of the engine body 3 has a strong momentum, and therefore, even when the combustion gas is introduced into the intake passageway 14 from the connecting point C2 via the combustion gas discharge pipe 73, the combustion gas does not flow back through the intake passageway 14. Hence, the combustion gas flows forward downstream through the intake passageway 14.

Further, since the engine 1 operates, the intake port opens, and therefore the combustion gas also flows toward the cylinders within the engine body 3. Hence, unlike in the state where the engine 1 has not yet operate and the combustion gas introduced into the intake passageway 14 cannot escape therefrom, there is no trouble if the intake throttle valve 23 is fully opened and the EGR valve is closed, as described above.

Now the discussion returns to S108. The premise in S108 is that the ignition switch is turned ON (see S101). Hence, the case of making the negative determination in S108 implies a state where the starter switch is not yet turned ON, though the ignition switch is turned ON. This state indicates a case where the car remains stopped without operating the engine 1, or a case where it is unnecessary for re-turning ON the starter switch because of the engine 1 having already independently operated.

As stated in S102, however, the premise of this routine is that the routine is executed immediately after the engine starting time. Hence, this does not include the case where the car remains stopped. Accordingly, if determined to be negative in S108, this means that the engine 1 has already independently operated, so that there is no need for turning ON the starter switch.

In this case, the processing proceeds to S109 and this implies an instance where the routine has already made one or more loops according to the necessity and the engine 1 is in the operating state, and hence there is no necessity for increasing the rotational speed of the fan as done in S113 in order to enhance the starting characteristic of the engine 1. Consequently, in S109, the rotational speed of the fan is decreased to return to the original state of the fan.

Regarding the rotational speed of the fan, the original state implies the fan control rotational speed in the stage in S112 before increasing the rotational speed of the fan.

The processing proceeds to S114 after S109.

Next, an operational effect of the thus constructed engine 1 will be described.

The ECU 11, which is the oxygen supply quantity control unit, performs, in the case where the operation executing condition of the combustion heater 9 is established such as at the starting time of the engine 1 (the engine starting time) and also the combustion gas is introduced into the intake passageway at that time, an increase of the air quantity by increasing the rotational speed of the air blow fan 90 (see S101, S113).

Then, the oxygen content in the combustion gas flowing to the intake passageway 14 via the combustion gas discharge passageway 73, is increased, and the combustion gas with the increased oxygen content flows to the intake passageway 14. With this operation, the augmentation control for augmenting the oxygen content in the engine intake air, is thus carried out.

Then, the augmented oxygen content under this augmentation control is an oxygen content enough to supplement the oxygen content in the engine intake air up to an oxygen content effective in enabling the engine 1 to start up, even if the above oxygen content decreases due to the introduction of the combustion gas itself into the intake passageway 14.

Accordingly, even when the intake air containing the combustion gas flows as the engine intake air toward the cylinders of the engine 1, it follows that the oxygen content sufficient for enabling the engine 1 to start up is ensured in the engine intake air at the engine starting time with a small rotational speed of the engine. Hence, even if the heater combustion gas as the exhaust gas is introduced into the intake passageway 14 at the engine starting time, the starting characteristic of the engine 1 is still good.

In addition, it is at the engine starting time and also introducing the combustion gas into the intake passageway 14 at that time that the ECU 11 as the oxygen supply quantity control unit executes the augmentation control of the oxygen content, and therefore the combustion heater 9 continues to operate for the duration of the execution of the augmentation control. That is, the fuel is burned. Accordingly, the high-temperature combustion gas is introduced into the intake passageway 14 at the engine starting time, and this high-temperature combustion gas raises the temperature of the intake air, thereby speeding up the warm-up of the engine.

Thus, in the engine 1, the combustion heater 9 is operated at the engine starting time, and, in addition, the ECU 11 as the oxygen supply quantity control unit introduces the combustion gas with the increased oxygen content into the engine intake air. Therefore, the warm-up characteristic can be enhanced, and the sufficient oxygen content in the engine intake air can be ensured. Hence, the starting characteristic of the engine 1 at a low temperature can be enhanced.

Further, the ignition method of the diesel engine is based on the heat of the compressed air, and hence, if the combustion chamber takes the intricate configuration as in the case of, e.g., the swirl chamber type diesel engine, the rate of the heat loss increases correspondingly. For this reason, there is used the low-temperature start assisting device such as the glow plug and the electric intake heater which emit the heat upon their conduction when starting up the diesel engine and thus assist the ignition in the combustion chamber. However, according to the present invention, such low-temperature start assisting devices are unnecessary because of being capable of starting at the low temperature. It is therefore feasible to reduce the number of parts and downsize the internal combustion engine.

Moreover, the engine can be started at the low temperature, and, as a result, a rate of lowering the temperature of the combustion gas due to heat radiation in, e.g., the engine intake system is small as compared to the internal combustion engine which cannot start-up unless the temperature is high. Accordingly, there is no need for adopting, for instance, a special heat insulating material as a measure for reducing the heat radiation.

Moreover, in the case where the air blow fan 90 which is the oxygen supplying device supplies the intake passageway 14 with the oxygen via the combustion gas introducing passageway 73, the combustion gas introducing passageway 73 serves also as the oxygen supply member. Consequently, the pipe utilized exclusively for supplying the oxygen becomes unnecessary, and hence the whole apparatus can be downsized correspondingly.

Further, at the engine starting time and also introducing the combustion gas into the intake passageway at that time, the ECU 11 controls the air blow fan 90 which is the oxygen supplying device to change the air blow quantity, thereby increasing the air current flowing through the combustion gas discharge pipe 73. Then, the oxygen content increases in proportion to the increased air current, and therefore it follows that the oxygen quantity enough to start up the engine 1 is ensured in the engine intake air. Accordingly, even if the heater combustion gas which is the exhaust gas is introduced into the intake passageway 14 at the engine starting time with the low rotational speed of the engine, the starting characteristic of the engine 1 is still good.

In addition, in the engine 1, the lower the rotational speed of the engine the smaller the quantity of the intake air. Hence, when the quantity of intake air is small, the quantity of fuel supplied to the combustion heater is reduced corresponding to this small quantity of intake air, thereby at least the combustion gas does not become rich. In consequence, the quantity of fuel supply to the combustion heater 9 at the starting time of the engine 1 is set equal to or smaller than the quantity of fuel supply to the combustion heater 9 when the internal combustion engine works other than the engine starting time, i.e., when the engine works independently, whereby an air-fuel ratio of the combustion gas can be made lean. Even when done in this manner, the oxygen content in the intake air can be increased.

Then, at the starting time of the engine 1 and also introducing the combustion gas into the intake passageway 14 at that time, the quantity of intake air is reduced by the intake throttle valve 23 which is the intake air quantity regulating device. To be more specific, since the intake throttle valve 23 is closed, the combustion gas discharged from the combustion heater 9 is, even when forced to flow back through the intake passageway 14, prevented from flowing this way by the intake throttle valve.

Therefore, the combustion gas cannot enter the combustion heater 9 via the air supply pipe 71 from the connecting point C1, at which the air supply pipe 71 is connected to the intake passageway 14, of the intake passageway 14, whereby deterioration in combustion (a rich accidental fire) in the combustion heater 9 can be prevented.

At the starting time of the engine 1 and also introducing the combustion gas into the intake passageway 14 at that time, the combustion gas, because of having the branch pipe 84 and the EGR passageway 8a as a bypass passageway which bypasses the cylinders, flows via the EGR passageway 8a and the branch pipe 84 and escapes to the exhaust system from the intake system. Hence, a rise in pressure in the intake system can be restrained. Consequently, the back flow can be prevented more effectively.

It is to be noted that, in S113 of the flowchart, the rotational speed of the fan 90a of the air blow fan 90 is increased and simultaneously the cranking is effected by operating the starter motor, but the cranking may also be effected after, preferably, immediately after increasing the rotational speed of the fan 90a.

In other words, there may be executed the augmentation control for augmenting the quantity of oxygen supplied to the intake passageway 14 by increasing the rotational speed of the fan 90a, which is the oxygen supply device, of the air blow fan 90 before the engine starting time (before cranking), thereby replenishing the oxygen content in the engine intake air.

<Second Embodiment>

Figure 7:
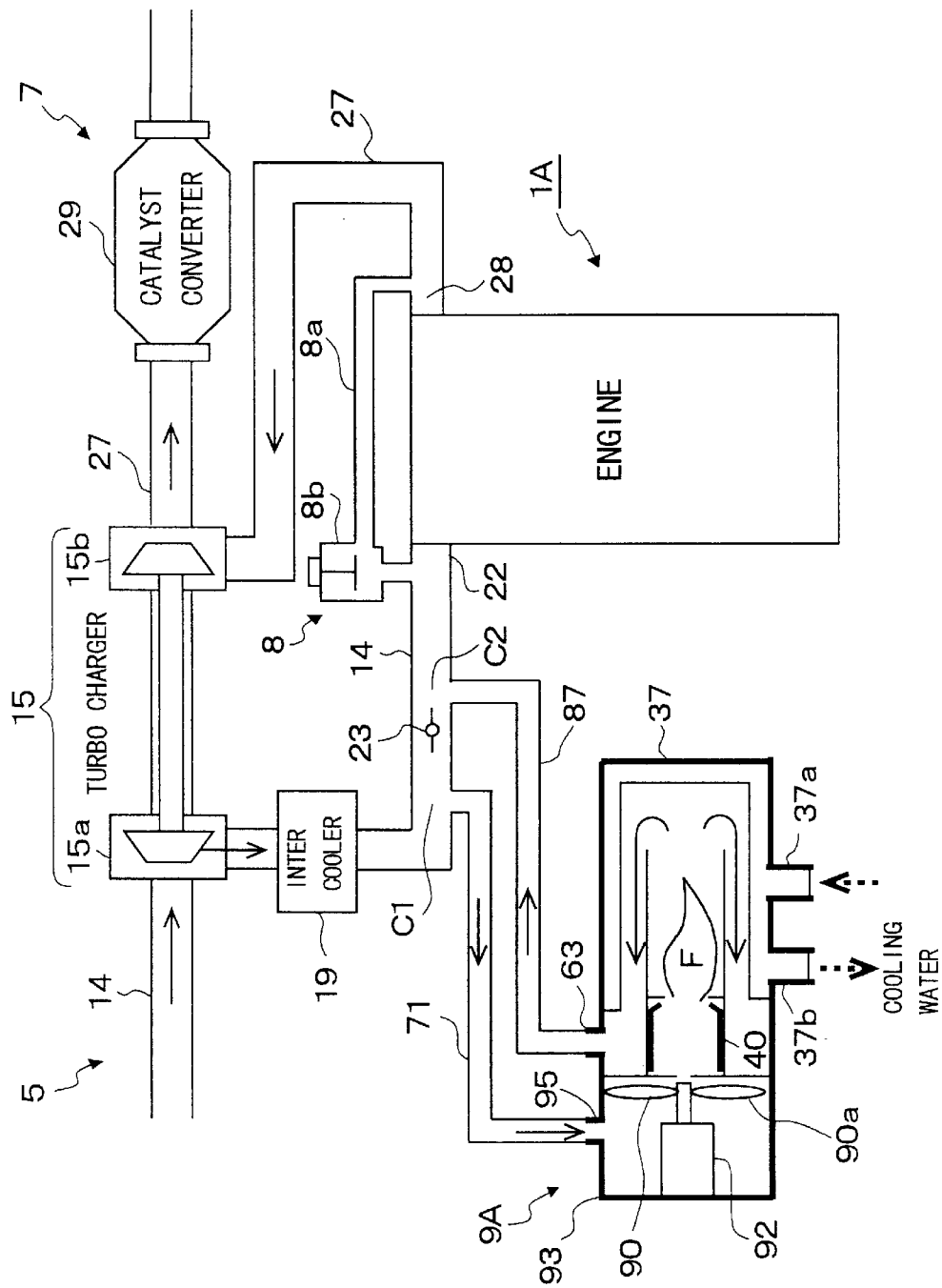
FIG. 7 is a schematic view showing a construction of the internal combustion engine having the combustion heater in a second embodiment of the present invention.

Next, a second embodiment of the present invention will be described referring to FIG. 7.

Different points of an engine 1A in accordance with the second embodiment from the engine 1 of the first embodiment are that the engine 1A has no branch pipe 84, and that the structure of the combustion heater and related elements are different. Hence, the same components as those of the engine 1 are marked with the same numerals, of which the repetitive descriptions are omitted. The illustration is, however, minimized enough to make the differences therebetween recognizable.

In the engine 1 of the first embodiment, the parallel connecting pipe 74 is connected to the combustion gas discharge pipe 73.

By contrast, the engine 1A of the second embodiment has such a geometry that the parallel connecting pipe 74 is connected to the intake passageway 14 and is thereby treated as a pipe corresponding to the combustion gas discharge pipe 73 of the first embodiment, and this pipe is herein designated by the numeral 87.

The intake-side discharge pipe 87 is a pipe through which the connecting point C2 is connected to the combustion gas discharge port 63 of a combustion heater 9A in the second embodiment. Further, the combustion heater 9A does not have the combustion gas discharge port 65. Hence, there is not the valve device 78 for opening and closing the combustion gas discharge port 65.

Moreover, the intake throttle valve 23 is likewise disposed between the connecting points C1, C2 also in the second embodiment. The EGR device 8, however, remains provided therein.

Hence, in the thus constructed engine 1A, at the engine starting time and also introducing the combustion gas into the intake passageway 14 at that time, the intake air quantity is reduced by the intake throttle valve 23 serving as the intake quantity regulating device, viz., the intake throttle valve 23 is closed, and therefore the combustion gas discharged from the combustion heater 9A never flows back through the intake passageway 14. Consequently, the combustion gas does not enter the combustion heater 9A via the air supply pipe 71 from the connecting point C1 of the intake passageway 14, at which the air supply pipe 71 is connected to the intake passageway 14, whereby the deterioration (the rich accidental fire) in combustion in the combustion heater 9A can be prevented.

Moreover, in addition to the intake throttle valve 23 being closed, the EGR passageway 8a serving as the bypass passageway which bypasses the cylinders opens, and therefore, in the case of introducing the combustion gas from the combustion heater 9A into the intake passageway 14 at the engine starting time, the combustion gas flows via the EGR passageway 8a and escapes to the exhaust passageway 27 from the intake passageway 14. Hence, a rise in pressure (exhaust pressure) in the intake passageway 14 can be restrained. Consequently, the back flow can be prevented more effectively.

<Third Embodiment>

Figure 8:
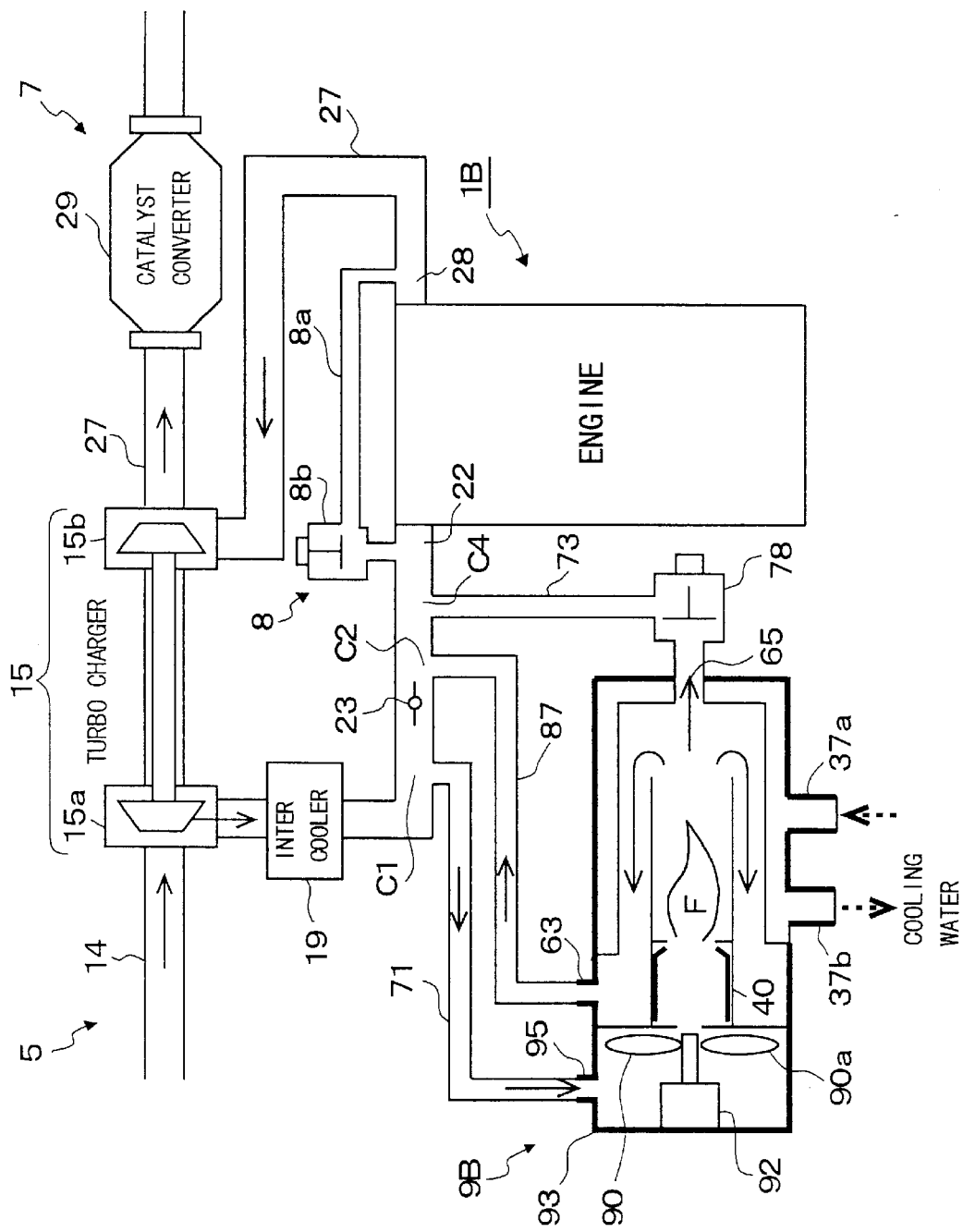
FIG. 8 is a schematic view showing a construction of the internal combustion engine having the combustion heater in a third embodiment of the present invention.

Next, a third embodiment of the present invention will be described referring to FIG. 8.

A different point of an engine 1B in accordance with the third embodiment from the engine 1A of the second embodiment is an addition of the following structural members. Hence, the same components as those of the engine 1A are marked with the same numerals, of which the repetitive descriptions are omitted.

A combustion heater 9B in the third embodiment is structured such that the engine 1A of the second embodiment includes the combustion gas discharge port 65 formed in the combustion heater 9 of the first embodiment, the valve device 78 for opening and closing the combustion gas discharge port 65 and the combustion gas discharge pipe 73 for connecting the combustion gas discharge port 65 to the intake passageway 14, thereby the combustion heater 9B is structured as a combustion heater with a combustion gas direct take-out valve.

Note that a connecting point of the combustion gas discharge pipe 73 to the intake passageway 14 is designated by a symbol C4 and disposed more downstream than the connecting point C2.

The thus constructed engine 1B provides the following operational effects in addition to the operational effects of the engine 1A.

That is, the combustion gas discharge port 65, which is the discharge port with the combustion gas direct take-out valve attached thereto, is opened by operating the valve device 78 at the engine starting time, with the result that a high-temperature combustion gas flows directly to the intake passageway 14. Therefore, when opening the combustion gas discharge port 65 at the engine starting time, a heat quantity needed for heating the intake air can be ensured even if a combustion quantity of the combustion heater 1B is set smaller than in the combustion heater 1A having no combustion gas discharge port 65.

As discussed above, in the engine having the combustion heater according to the present invention, the combustion gas produced by burning the fuel is introduced into the internal combustion engine, and the combustion heater raises the temperature of the intake air in the internal combustion engine by utilizing the heat held by the combustion gas. In the internal combustion engine having this combustion heater, it is possible to enhance the starting characteristic of the internal combustion engine by ensuring the sufficient oxygen content in the engine intake air while improving the warm-up characteristic of the internal combustion engine.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An internal combustion engine having a combustion heater for raising a temperature of intake air of said internal combustion engine by utilizing combustion heat held by a combustion gas emitted when burning a fuel, and a combustion gas introducing passageway, through which a combustion gas discharge port of the combustion heater is connected to an engine intake passageway, for introducing the combustion gas into the intake passageway, said internal combustion engine comprising:

an oxygen supplying apparatus for supplying oxygen to the engine intake air having become the engine intake air containing the combustion gas when the combustion gas is introduced via said combustion gas introducing passageway into said engine intake passageway; and an oxygen supply quantity control apparatus for controlling a quantity of oxygen supplied by said oxygen supplying apparatus, and wherein said oxygen supply quantity control apparatus executes, at the engine starting time or before the engine starting time and also introducing the combustion gas into said engine intake passageway at that time, an augmentation control of augmenting the quantity of oxygen supplied to the engine intake air by said oxygen supplying apparatus, the oxygen content in the engine intake air that is decreased due to the introduction of the combustion gas into said intake passageway, is supplemented under the augmentation control, and this oxygen supplement makes the engine intake air the intake air with the oxygen content effective in enhancing a starting characteristic of said internal combustion engine.

2. An internal combustion engine having a combustion heater according to claim 1, wherein said oxygen supplying apparatus supplies said engine intake passageway with the oxygen through said combustion gas introducing passageway.

3. An internal combustion engine having a combustion heater according to claim 2, wherein said oxygen supplying apparatus is an air blow device capable of making an air quantity variable, and said air blow device is an air blow fan for supplying said combustion heater with the air for combustion.

4. An internal combustion engine having a combustion heater according to claim 3, wherein said air blow fan includes a fan, a driving unit for rotationally driving said fan, and a fan rotational speed control device for controlling the rotational speed of said fan by controlling an operation of said driving unit, and said fan rotational speed control device sets, at the engine starting time or before the engine starting time, the rotational speed of said fan higher than that of in operation other than the starting time of said internal combustion engine.

5. An internal combustion engine having a combustion heater according to claim 1, wherein a quantity of fuel supply to said combustion heater, at the engine starting time or before the engine starting time, is set equal to or smaller than the quantity of fuel supply in the engine operation other than the engine starting time.

6. An internal combustion engine having a combustion heater according to claim 1, wherein said combustion heater includes:

an air supply passageway connected to said intake passageway and thereby functioning to supply said combustion heater with intake air as the air for combustion which flows through said intake passageway, and an intake air quantity regulating apparatus, provided between a connecting point at which said air supply passageway is connected to said intake passageway and a connecting point at which said combustion gas introducing passageway is connected to said intake passageway, for regulating the quantity of intake air in said intake passageway, and wherein said intake air quantity regulating apparatus reduces, at the engine starting time or before the engine starting time and also introducing the combustion gas into said intake passageway at that time, the quantity of intake air.

7. An internal combustion engine having a combustion heater according to claim 1, further comprising:

a bypass passageway, bypassing cylinders, for making said engine intake system and an engine exhaust system communicate with each other, and wherein at the engine starting time or before the engine starting time and also discharging the combustion gas from said combustion heater, the combustion gas is flowed to an engine exhaust passageway from said intake passageway via said bypass passageway.

* * * * *